US011235396B2

(12) United States Patent
Pospisil et al.

(10) Patent No.: US 11,235,396 B2
(45) Date of Patent: Feb. 1, 2022

(54) SYSTEM AND METHOD FOR SELF CONTAINED THROUGH SENSOR FOR DETERMINING AN ACTUATION POSITION FOR A MACHINE

(71) Applicant: MTM ROBOTICS LLC, Mukilteo, WA (US)

(72) Inventors: Eric Pospisil, Mukilteo, WA (US); Manny Leyden, Mukilteo, WA (US); Michael Gary Woogerd, Mukilteo, WA (US); Chace Howard Fadlovich, Mukilteo, WA (US)

(73) Assignee: MTM Robotics, LLC, Mukilteo, WA (US)

( * ) Notice: Subject to any disclaimer, the term of this patent is extended or adjusted under 35 U.S.C. 154(b) by 241 days.

(21) Appl. No.: 16/275,884

(22) Filed: Feb. 14, 2019

(65) Prior Publication Data

US 2020/0262048 A1    Aug. 20, 2020

(51) Int. Cl.
*B23B 49/00* (2006.01)
*B25H 1/00* (2006.01)
(Continued)

(52) U.S. Cl.
CPC .............. *B23B 49/00* (2013.01); *B23B 45/02* (2013.01); *B25F 5/021* (2013.01); *B25H 1/0078* (2013.01); *B32B 37/00* (2013.01)

(58) Field of Classification Search
CPC ......... B25F 5/021; B23B 45/02; B23B 49/00; B23B 37/00; B23B 2215/04;
(Continued)

(56) References Cited

U.S. PATENT DOCUMENTS 4,505,054 A    3/1985 Clark et al.
4,698,996 A    10/1987 Kreft et al.
(Continued)

OTHER PUBLICATIONS

Marschall et al., Position Control of a Robot End-Effector Based on Synthetic Aperture Wiresless Localization, Sep. 14-18, 2014; IEEE/ RSJ International Conference on Intelligent Robots and Systems, pp. 163-168 (Year: 2014).
(Continued)

*Primary Examiner* — Eric A. Gates
*Assistant Examiner* — Paul M Janeski
(74) *Attorney, Agent, or Firm* — FisherBroyles LLP; Kevin D. Jablonski

(57) ABSTRACT

A self-contained hand-held through-skin (HHTS) sensor for determining the location of an underlying aperture in a support structure suited to mount a skin or surface. In an embodiment, the HHTS sensor includes a sensor disposed in a housing and configured to determine a location of an aperture disposed in an adjacent surface through electromagnetic, x-ray, ultrasonic or other means. The HHTS sensor further includes an alignment assembly having an alignment orifice disposed in the housing and configured to be maneuvered in an x-y plane within the housing. The HHTS sensor also includes a vacuum pump system, a local battery and a processor coupled to the sensor and configured to control first and second actuators to maneuver the alignment orifice within the x-y plane to be co-axially located with the aperture in response to the sensor signal.

17 Claims, 6 Drawing Sheets

(51) Int. Cl.
   *B25F 5/02* (2006.01)
   *B23B 45/02* (2006.01)
   *B32B 37/00* (2006.01)
(58) Field of Classification Search
   CPC ......... B23B 2260/128; B23B 2260/118; B23B 39/14; B23B 2247/12; B25H 1/0078
   See application file for complete search history.

(56) References Cited

U.S. PATENT DOCUMENTS

| | | |
|---|---|---|
| 6,124,708 A | 9/2000 | Dames |
| 6,357,101 B1 | 3/2002 | Sarh et al. |
| 6,690,159 B2 | 2/2004 | Burreson et al. |
| 6,891,988 B2 | 5/2005 | Chaparala |
| 6,927,560 B2 | 8/2005 | Pedigo et al. |
| 8,573,465 B2 | 11/2013 | Shelton, IV |
| 10,353,105 B2 | 7/2019 | Hughes |
| 2002/0050043 A1 | 5/2002 | Sarh et al. |
| 2002/0111713 A1 | 8/2002 | Wang et al. |
| 2003/0083673 A1 | 5/2003 | Tierney et al. |
| 2005/0052898 A1 | 3/2005 | Arntson |
| 2009/0022556 A1 | 1/2009 | Clark |
| 2010/0180711 A1 | 7/2010 | Kilibarda et al. |
| 2011/0210720 A1 | 9/2011 | Corry |
| 2016/0297073 A1 | 10/2016 | Whalen-Robinson et al. |
| 2017/0095927 A1 | 4/2017 | Fadlovich et al. |
| 2017/0097633 A1 | 4/2017 | Fadlovich et al. |
| 2018/0259669 A1 | 9/2018 | Hughes |

OTHER PUBLICATIONS

MTM, Hand Held Through Skin Sensor (TSS); Nov. 30, 2017; MTM Robotics; www.mtmrobotics.com; pp. 1-11 (Year 2017).
Melanie Martella; Drilling in the Right Place; Jan. 2005; http://www.fierceelectronics.com/page 1 (Year: 2005).

SYSTEM AND METHOD FOR SELF CONTAINED THROUGH SENSOR FOR DETERMINING AN ACTUATION POSITION FOR A MACHINE

RELATED APPLICATION DATA

The present application is related to U.S. patent application Ser. No. 16/275,864, entitled System and Method for Automated Aperture Alignment in Response to Detecting an Object filed Feb. 14, 2019 and U.S. patent application Ser. No. 16/275,919, entitled System and Method for Automation of Sensing and Machine Actuation in a Manufacturing Environment filed Feb. 14, 2019.

BACKGROUND

As manufacturing environments become more automated and complex, robotics and other automated machinery is becoming more and more prevalent in all phases of manufacturing. Very specific tasks that are conventionally performed by a skilled artisan may be performed using highly specialized robotics having highly specialized tools and/or end effectors. For example, drilling holes in composite sections of a contoured section of an airplane wing or car body may require a high level of precision with respect to applying torque to a motor for moving the end effector around a contoured wing surface such that a drill hole is drilled precisely over a receiving hole of an underlying structure.

In conventional manufacturing environments, a worker may have used a conventional through-skin sensor to detect an underlying target or hole (wherein a "skin" may refer to a surface structure or body panel of a car body or airplane body). As such, the worker may manually maneuver a hand-held through-skin sensor until the sensor determines that the underlying target or hole is aligned with a drill aperture. Then, a second worker (or in some cases, the same worker accomplishes a new task) may place a drill bit on the identified target or hole location to drill a hole through the skin at the identified location. This is inefficient as one or two workers are needed to manipulate two different devices and the process is tedious as the first worker needs to manually maneuver the aperture of the through-skin sensor until aligned and then hold in place while the second worker completes a drilling procedure (or first worker who holds the sensor in place while drilling). This tedious, work-intensive, inefficient process is in need of a novel and modern overhaul.

BRIEF DESCRIPTION OF THE DRAWINGS

Aspects and many of the attendant advantages of the claims will become more readily appreciated as the same become better understood by reference to the following detailed description, when taken in conjunction with the accompanying drawings, wherein:

DETAILED DESCRIPTION

Figure 1:
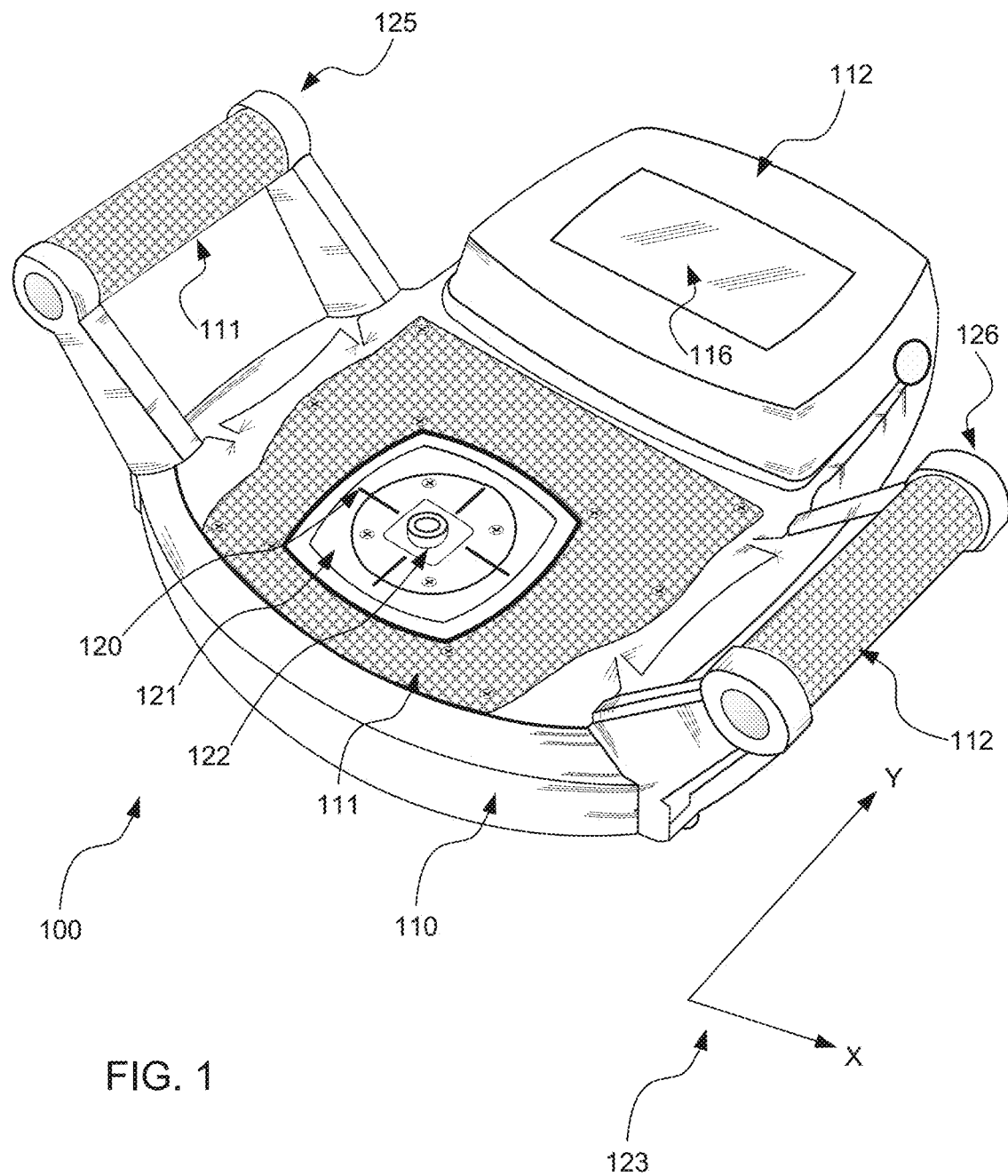
FIG. 1 shows an isometric view of a hand-held through-skin sensor having automated aperture-locating mechanism according to an embodiment of the subject matter disclosed herein.

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

The subject matter disclosed herein is directed to a system (and method for use thereof) of a hand-held through-skin (HHTS) sensor (or automated machine-mounted in some embodiments) that can determine the location of an underlying aperture in a support structure suited to mount a skin or surface. In an embodiment, the HHTS sensor includes a sensor disposed in a housing and configured to determine a location of an aperture disposed in an adjacent surface through electromagnetic, x-ray, ultrasonic or other means. The HHTS sensor further includes an alignment assembly having an alignment orifice disposed in the housing and configured to be maneuvered in an x-y plane within the housing. The alignment assembly includes a first actuator configured to move the alignment orifice in the x-direction in the x-y plane and a second actuator configured to move the alignment orifice in the y-direction in the x-y plane. To control the automated aspects of aperture detection and co-location, the HHTS sensor also includes a processor coupled to the sensor and configured to receive a signal from the sensor indicating the location of the aperture and configured to control the first and second actuators to maneuver the alignment orifice within the x-y plane to be co-axially located with the aperture in response to the sensor signal.

Further, the HHTS sensor may be a self-contained unit in that the sensor includes a battery and a vacuum pump system that are disposed within the housing. The vacuum pump system may be mechanically coupled to one or more suction cups disposed on the housing such that the HHTS sensor may be secured to a surface where an underlying aperture is to be detected. The HHTS sensor may further include handles for easy maneuvering by a human user and may further include mounting interfaces for mounting the HHTS sensor as an end effector onto a modular robotic system under control of a master control system.

As foreshadowed in the background, a robotic manufacturing systems may include carriages, assemblies, and actuators to which are attached end-effectors and other tooling. Under a master control system or master control operator, the robot arm may move an end effector *such as the HHTS sensor) into position where the end effector performs its intended manufacturing task. For example, to fasten a surface to an underlying support structure having apertures, a human operator or a master control system may utilize the HHTS sensor to detect and accurately locate underlying apertures in as support structure despite being unable to be seen from the one side of the surface. Once located and an alignment orifice is maneuvered to be co-axially located with the underlying detected aperture, Then, a different end-effector (or hand-held device) drills one or more holes through the surface, while still a third end-effector inserts fasteners (e.g., rivets) into the holes, and installs the fasteners, thereby securing the surface to the support structure.

Various embodiments of the inventive self-contained HHTS sensor are well suited for modular manufacturing environments where an operator may quickly and easily place the HHTS sensor on a surface that it is need of drilled through-holes in precise locations. Further, the modular nature of the HHTS sensor is also well suited to be part of an overall automated system under the control of a master control system. Further, the modularity and efficiency of the various portions of the overall manufacturing system is increased thereby reducing downtime and repair costs. These and other aspects of the subject matter disclosed herein are better understood with respect to the descriptions of FIGS. 1-6 below.

FIG. 1 shows an isometric view of a hand-held through-skin sensor 100 (HHTS sensor, hereinafter) having automated aperture-locating mechanism 121 according to an embodiment of the subject matter disclosed herein. The HHTS 100 may be used in a typical manufacturing environment where there is a need to determine the location of an aperture (e.g., a bolt or rivet hole/receptacle) that is located below a skin or surface (e.g., an airplane body panel or car body panel). As such, as the aperture to be located cannot be seen from above the surface, a need to locate the aperture from the top-side of the surface exists so as to be able to drill a hole or punch a fastener through the surface at the exact location of the underlying aperture designated to secure the fastener below the surface. In this manner, the fastener (and several other similarly situated fasteners) may hold the surface to an underlying body support structure. Thus, it becomes important to quickly and accurately locate the underlying aperture to keep a manufacturing process moving forward quickly and with precision.

The HHTS sensor 100 includes a housing 110 for containing and mounting all component so the HHTS sensor 100. The housing may include a lower portion 111 that contains a cavity for mounting the automated aperture-locating mechanism 121. The various components of the automated aperture-locating mechanism 121 are described below with respect to FIG. 5, but for now, the portion includes an alignment orifice 122 (sometimes called a bushing or drill-bit bushing) mounted to an alignment assembly (not shown as it is disposed inside the lower portion 111 of the housing 110) suited to move the alignment orifice 122 in an x-y plane 123 as controlled by a processor (not shown in FIG. 1). The alignment assembly includes a first actuator configured to move the alignment orifice 122 in the x-direction in the x-y plane 123 and a second actuator configured to move the alignment orifice in the y-direction in the x-y plane 123. The alignment orifice 122 may be flanked by a sensor array 120 that is disposed within the housing and on the movable assembly co-located with the alignment orifice 122. That is, the sensor may move on the assembly in concert with the alignment orifice. As will be described in greater detail below with respect to FIG. 2-5, the sensor array 120 may be configured to detect the underlying aperture so as to provide a feedback signal to the processor which can manipulate the alignment assembly to move the alignment orifice 122 to the location of the underlying aperture within the housing 110. That is, the housing 110 will remain stationary with respect to the surface and the alignment orifice 122 will be moved to the aperture.

When an operator first approaches a situation for using the HHTS sensor 100, the operator may grasp the HHTS sensor 100 using a left-side handle 111 and a right-side handle 112 that are disposed on the housing 110 at respective right and left sides of the housing 110. These handles 111 and 112 include respective actuation buttons 125 and 126, a first actuation button 125 located on a top portion of the left-side handle 111 and a second actuation button 126 located on a top side of the right-side handle 112. These actuation buttons 125 and 126 enable the operator to initiate two different automated procedures for locating the underlying aperture when the HHTS sensor 100 is near an underlying aperture (described next).

As an operator approaches a manufacturing situation where an underlying aperture is to be located, the operator may place the HHTS sensor 100 relatively close to where the operator believes the underlying aperture to be. That is, the operator will "guess" where the underlying aperture is and move the HHTS sensor 100 (by moving with the handles 111 and 112) to be near the surface. When placed near the underlying aperture, the sensor array 120 will detect the aperture and send a sensor signal to a processor in the HHTS sensor 100. The processor will, in turn, interpret the sensor signal to determine where the detected aperture is in relation to the alignment orifice (e.g., vector and distance). This relative distance may be shown in a graphical format using the display 116. That is, the display may show the alignment orifice 122 at the center of the display 116 while the detected aperture location is shown somewhere within the x-y plan 123 of the display 116 as well. If the detected aperture position is, in fact, within the x-y plane 123 of the display, then the operator can know that this is "close enough" for the HHTS sensor to automatically co-locate the alignment orifice with the detected aperture. Thus, the operator may actuate the first actuation button 125 on the HHTS sensor 100 to engage a lock-in-place procedure whereby a vacuum suction sub-system (not shown in FIG. 1) secures the HHTS sensor 100 to the surface. In this manner, the HHTS sensor 100 is secured to the surface near the aperture so the operator may engage a second procedure to automatically move the alignment orifice 122 to be co-axially located with the detected aperture as described next.

Once secured in place by the vacuum suction sub-system, an operator may actuate the second actuation button 126 whereby the processor determines how far the alignment orifice 122 needs to move in the x direction and the y direction in the x-y plane 123 and then generates control signals to maneuver the movable assembly in the x-direction and the y-direction to co-axially locate the alignment orifice 122 with the underlying detected aperture. Thus, the processor may control an x-direction actuator (not shown in FIG. 1) to maneuver the alignment orifice 122 in the x-direction within the x-y plane. Similarly, the processor may control a y-direction actuator (not shown in FIG. 1) to maneuver the alignment orifice 122 in the y-direction within the x-y plane 123. The maneuverings within the x-y plane 123 are intended to co-locate the center point of the alignment orifice with the center point of the located underlying aperture. In this manner, a through-hole may be drilled in the surface (e.g., through the skin) so that a fastener (e.g., bolt or rivet or the like) may be used to secure the surface to an underlying support structure. These procedures are discussed further below with respect to FIGS. 3-5. Prior to this discussion, the nature and patterns of various embodiments of the sensor array 120 are discussed with respect to FIGS. 2A-2D.

FIG. 2A-D show different configurations of a sensor array 120 that may be disposed in the hand-held through-skin sensor of FIG. 1 according to embodiments of the subject matter disclosed herein. In short, the sensor array 120 may include a number of different patterns of sensors and/or configurations of sensor configured to generate signals to the processor facilitate the zeroing in on an underlying aperture at or near the secured HHTS sensor 100. The sensor array 120 may be comprised of electromagnetic sensors, x-ray sensors or ultra-sonic sensors. While a skilled artisan understands manners in which x-ray sensors or ultra-sonic sensors may be implemented, the remainder of this disclosure discusses manners in which electromagnetic sensors may be implemented.

Figure 2A:
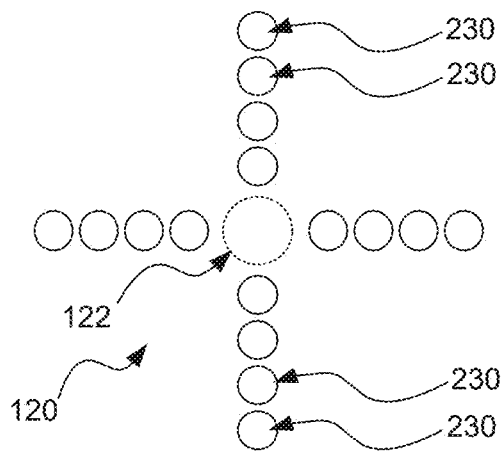
FIG. 2A-D show different configurations of a sensor array that may be disposed in the hand-held through-skin sensor of FIG. 1 according to embodiments of the subject matter disclosed herein.

In these embodiments, the different configurations of sensor arrays 120 feature a plurality of electromagnetic sensor elements 230 arranged in specific patterns. These elements 230 may comprise both an electromagnetic field generating portion (e.g., a position that generates a magnetic field) and an electromagnetic field sensing portion (e.g., a magnetic field sensor) (not shown individually). In other embodiments, these elements 320 are just magnetic field sensors that detect an electromagnetic field generated from a remote target device. FIG. 2A shows a first sensor array configuration wherein the sensor pattern comprises a first set of eight magnetic sensor elements 230 disposed on a first axis and a second set of eight magnetic sensor elements 230 disposed on a second axis perpendicular to the first axis. In this configuration, a first set of four sensor elements within the first set of eight sensor elements aligned in the first axis may be disposed on one side of the alignment orifice 120 while the other set of four elements in the first set of eight sensor elements aligned in the first axis may be disposed on an opposite side of the alignment orifice 120 (still aligned within the first axis). Likewise, a first set of four sensor elements within the second set of eight sensor elements aligned in the second axis may be disposed on one side of the alignment orifice 120 while the other set of four elements in the second set of eight sensor elements aligned in the second axis may be disposed on an opposite side of the alignment orifice 120 (still aligned within the second axis). The configurations of electromagnetic sensor elements 230 in FIG. 2A may be part of a detection algorithm suited to determine the location of the underlying aperture. Sensor readings are obtained either using the absolute magnitude of the sensor's readings from all axes, or by using just the Z reading of the sensor. Using just the Z axis readings reduces the range of the sensor but has less sensitivity to errors introduced by magnet tilt. The rest of the algorithm is unchanged by this choice.

$$V=\sqrt{V_x^2+V_y^2+V_z^2}$$

OR $$V=V_z$$

The detection algorithm is embodied in a proportional-integral-derivative (PID) controller suited to generate one or more move vectors. In various embodiments, differential measurements (e.g., the differences between the detected aperture position and the orifice position) are calculated by subtracting the magnetic field reading on a given sensor from the reading of the sensor on the opposite side of the unit. Each of these pairs of sensors may be sampled in iterations to generate move vectors over time. The move vectors are separated into X and Y vector components based on the geometry of the sensor pair with respect to the alignment orifice and the X-Y coordinate plane (123 of FIG. 1). For example, a sensor pair at 30 degrees to the horizontal of the x-axis contributes sin(30°)*(Move vector) to X and cos(30°)*(Move vector) to X. Move vectors for X and Y from each sensor are summed to produce a "net move vector" for X ($V_X$) and a "net move vector" for Y ($V_Y$), as below:

$$V_X = \sum_{i=1}^{n/2} V_i \times \cos(\theta_i) - \sum_{j=n/2+1}^{n} V_j \times \cos(\theta_j)$$

$$V_Y = \sum_{i=1}^{n/2} V_i \times \sin(\theta_i) - \sum_{j=n/2+1}^{n} V_j \times \sin(\theta_j)$$

If a sensor pair is overflowed (e.g., the move vector will not resolve), that specific sensor pair is temporarily excluded from the calculation for one or more iterations, and the previous readings from that sensor pair are used until the overflow ends. The net move vector is then scaled by the largest sensor pair reading seen during this referencing run ($V_{max}$), to allow the system to operate independent of target depth. The result is a unit-move vector in each of X and Y.

$$\bar{V}_X = \frac{V_X}{V_{max}}$$

$$\bar{V}_Y = \frac{V_Y}{V_{max}}$$

The unit-move vector is used to set a position target for the PID controller for the actuator responsible for movement in the respective axis. PID feedback is provided by linear potentiometers associated with each axis actuator. Axis movement actuation may be stopped once the unit move vector for the respective axis falls below a configurable value, allowing a mutually beneficial tradeoff between accuracy and search speed.

Additional algorithm influences and safeguards may be present. In a first influence, a minimum sensor reading may be used to determine if a target magnet is present. If there is no appreciable detection of any electromagnetic field, the HHTS sensor may return an error to the operator (e.g., return an error message on its display or generate signal to remote operation base). In a second influence, a sensor overflow restriction parameter may ensure that no sensor pair is still saturated (e.g., still in an overflow state) when the search has completed before transitioning to iterative move vector generations. If the HHTS sensor determines that one or more sensor pairs are still in overflow states, an error will be given to the operator. In a third influence, a minimum successful read count parameter may be used to ensure the system does not succeed on the basis of only a single success reading that could be affected by environmental noise. That is, at least a second pair of sensors is needed to return meaningful feedback for the algorithm to proceed.

In another embodiment, the HHTS sensor also incorporates a zeroing feature to improve accuracy by controlling for the presence of earth's magnetic field and other magnetic sources near the system. To make use of this, the HHTS sensor may be "homed" prior to the installation of the target magnet. Readings for each sensor are collected over a 1 second period and averaged, and these readings are subsequently subtracted from the sensor when performing a search. This feature may improve accuracy by over 0.25 mm. Another safeguard for this system is a maximum reading and maximum standard deviation of the average reading for each sensor that can be detected during the homing step. If either the maximum reading or the standard deviation exceeds a configurable value, the homing step will fail on the basis that there are excessively large or fluctuating magnetic fields present. Each of the above-described aspects, features, safeguards and/or influences may be implemented with respect to each of the following sensor configurations as well.

Figure 2B:
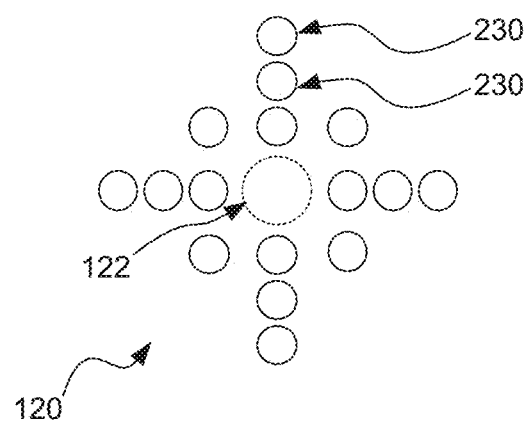

FIG. 2B shows a second sensor array 120 configuration wherein the sensor pattern comprises a first set of six magnetic sensor elements 230 disposed on a first axis and a second set of six magnetic sensor elements 230 disposed on a second axis perpendicular to the first axis. In this configuration, a first set of three sensor elements within the first set of six sensor elements aligned in the first axis may be disposed on one side of the alignment orifice 122 while the other set of three elements in the first set of six sensor elements aligned in the first axis may be disposed on an opposite side of the alignment orifice 122 (still aligned within the first axis). Likewise, a first set of three sensor elements within the second set of six sensor elements aligned in the second axis may be disposed on one side of the alignment orifice 122 while the other set of three elements in the second set of six sensor elements aligned in the second axis may be disposed on an opposite side of the alignment orifice 122 (still aligned within the second axis). Further, an additional four sensor elements are disposed at corners of a three by three square formed with the first sensor element of each of the sets of three described above.

Figure 2C:
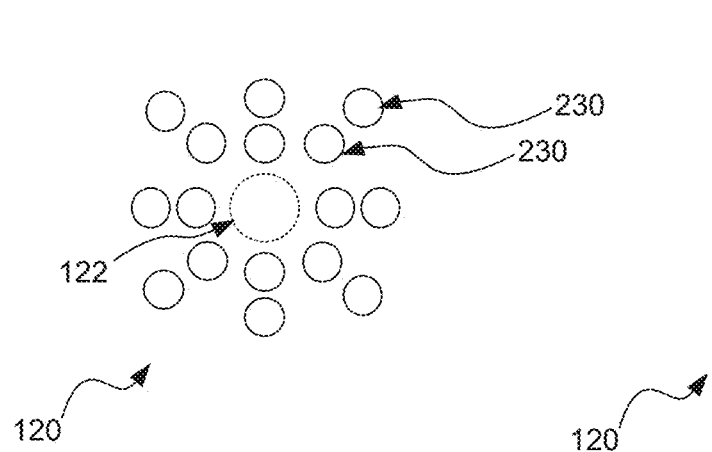

FIG. 2C shows a third sensor array 120 configuration wherein the pattern comprises a first set of four magnetic sensor elements disposed on a first axis, a second set of four magnetic sensor elements disposed on a second axis perpendicular to the first axis, a third set of four magnetic sensor elements disposed on a third axis that is offset from the each of the first and second axes by 45 degrees, and a fourth set of four magnetic sensor elements disposed on a fourth axis perpendicular to the third axis.

Figure 2D:
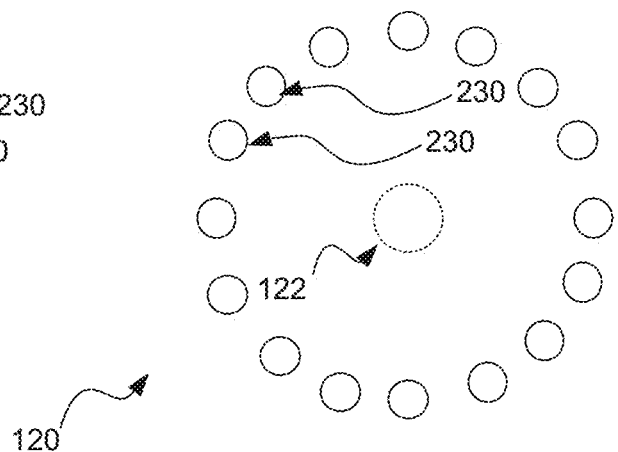

FIG. 2D shows a fourth sensor array 120 configuration wherein the pattern comprises a set of 16 magnetic sensor elements 230 disposed in a circular pattern, each magnetic sensor array 120 disposed equidistant from the alignment orifice 122. Other array configurations and patterns are contemplated and/or possible but not discussed herein for brevity.

Figure 3:
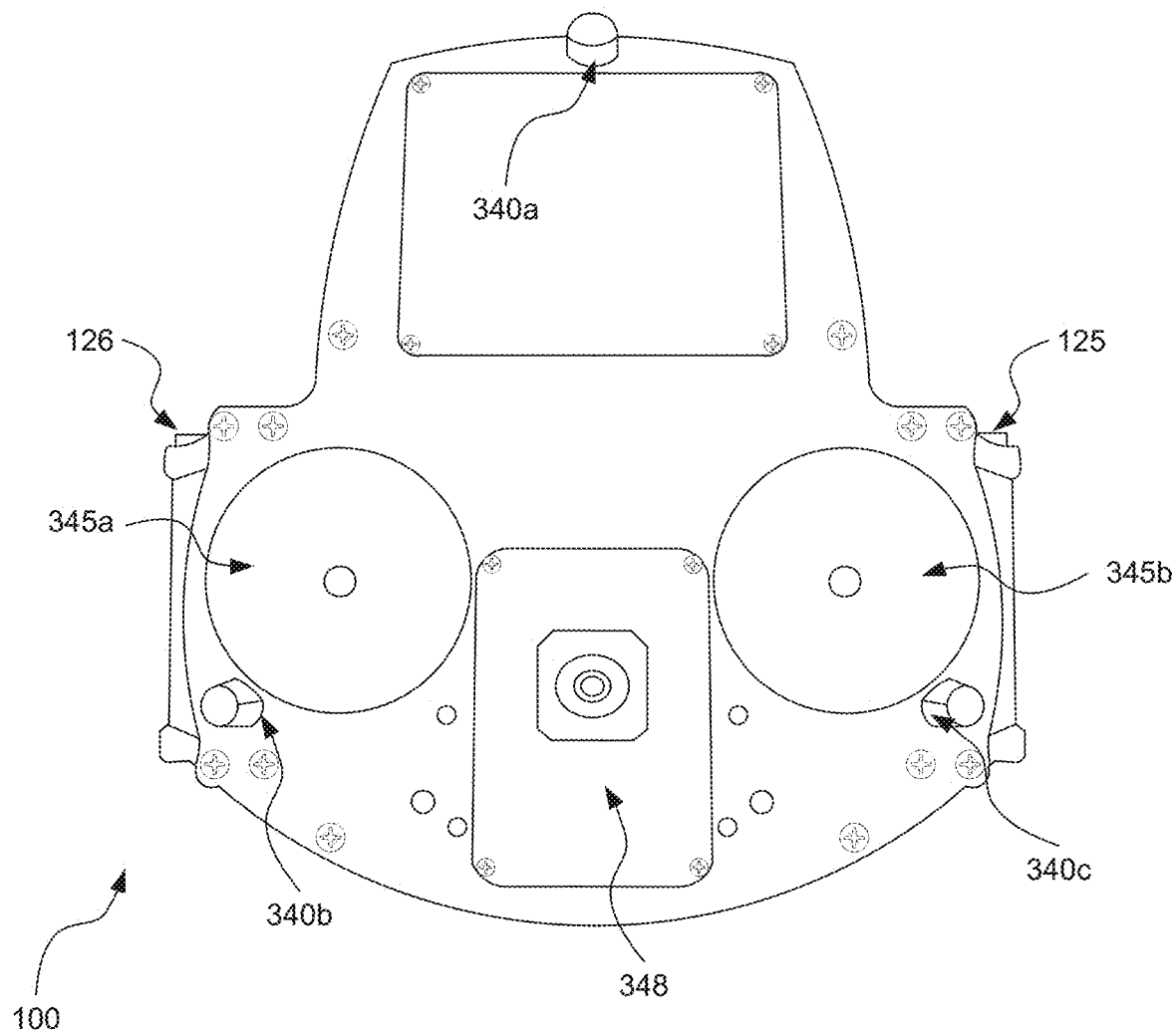
FIG. 3 shows a rear view of the HHTS sensor 100 of FIG. 1 showing a surface engagement mechanism according to an embodiment of the subject matter disclosed herein.

FIG. 3 shows a rear view of the HHTS sensor 100 of FIG. 1 showing a surface engagement mechanism according to an embodiment of the subject matter disclosed herein. The surface engagement mechanism includes several components such as surface suction cups 345a and 345b that are coupled to a vacuum pump (not shown) powered by an on-board battery (not shown). The vacuum pump and battery may be disposed below a rear-access cover plate 348. The mechanism further includes surface alignment posts 340a-c for ensuring that the alignment orifice is aligned normal to the surface being engaged.

When an operator first approaches a surface wherein an underlying aperture is to be located, the operator may place the rear side of the HHTS sensor 100 facing the surface in a location reasonably thought to be close to the aperture. The sensor system will attempt to locate the aperture and display a representation of it on the display screen on the front side of the HHTS sensor 100. If the aperture can be seen in the display, the operator may actuate the first actuation input/button 125 to secure the HHTS sensor 100 to the surface using the surface engagement mechanism. Thus, the vacuum pump will initiate pumping are from cavities formed by the surface suction cups 345a and 345b and the engaged surface. When a threshold pressure is reached or when the alignment points are all sufficiently engaged with the surface, the vacuum pump is turned off and the HHTS sensor 100 may be ready to engage the automated aperture location procedure by actuating the second actuation input/button 126.

Figure 4:
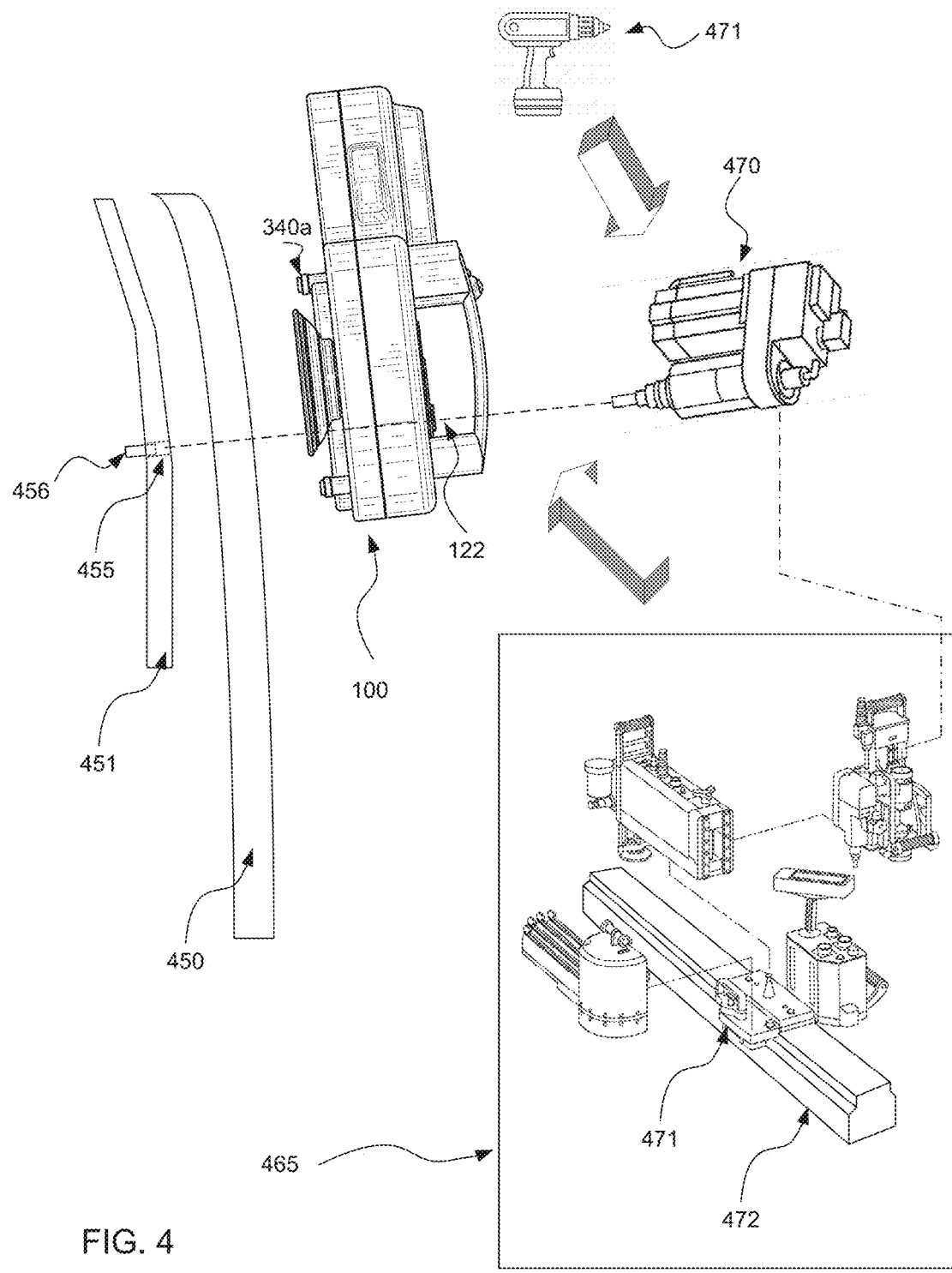
FIG. 4 shows the hand-held through-skin sensor of FIG. 1 in conjunction with a drilling system engaged with a surface according to an embodiment of the subject matter disclosed herein.

FIG. 4 shows the HHTS sensor 100 of FIG. 1 in conjunction with a drilling system 465 engaged with a surface 450 according to an embodiment of the subject matter disclosed herein. In this view, one can see the HHTS sensor 100 placed near a surface that may be in need of a through hole (e.g., by way of drilling using a drill 470) concentrically placed with and undying aperture 455 that is disposed on a support structure 451. In this embodiment, the HHTS sensor 100 may be an electromagnetic sensing device such that a magnetic target 456 may be placed in the aperture to provide an object in which the HHTS sensor 100 can detect. Thus, an operator may physically place the HHTS sensor 100 near the surface in a place reasonably close to the underlying aperture 455 and then initiate the automated procedure for maneuvering the alignment orifice 122 to be concentrically aligned with the detected magnetic target 456 that is placed in the aperture 455.

Once the aperture 455 has been located and the alignment orifice 122 is concentrically aligned with the detected aperture 455, an additional manufacturing task, such as drilling a through hole in the surface 450, may be accomplished. Thus, an operator may utilize a separate manual hand-drill 471 or an automated end-effector drill 470 to bore a hole through the surface by maneuvering the drill bit through the alignment orifice 122 (e.g., through the drill-bit bushing). Once drilled, the operator may remove the HHTS sensor 100 and install some manner of a fastener, e.g., a rivet or a bolt (not shown), to secure the surface 450 to the support structure 451 though the newly bored through-hole and the aperture 455.

In other embodiments, the HHTS sensor 100 and the drill 470 may be part of an overall automated manufacturing system 465 whereby these "end-effectors" are mounted on a carriage 471 that may be movably attached to a rail system 472. In this manner, the operator may control all components through a remote-control system (not shown) or the overall process may be automated such that operator control is not needed once the process has been imitated. That is, the automated manufacturing system 465 may engage an automated procedure to locate all underlying apertures 455 in a support structure 451, subsequently drill through-holes in the surface 450 at each aperture location and install fasteners at each drilled location. Aspects of such an automated system are described in greater detail in U.S. patent application Ser. No. 14/876,415 co-owned by the assignee of the present application and hereby, incorporated by reference.

Figure 5:
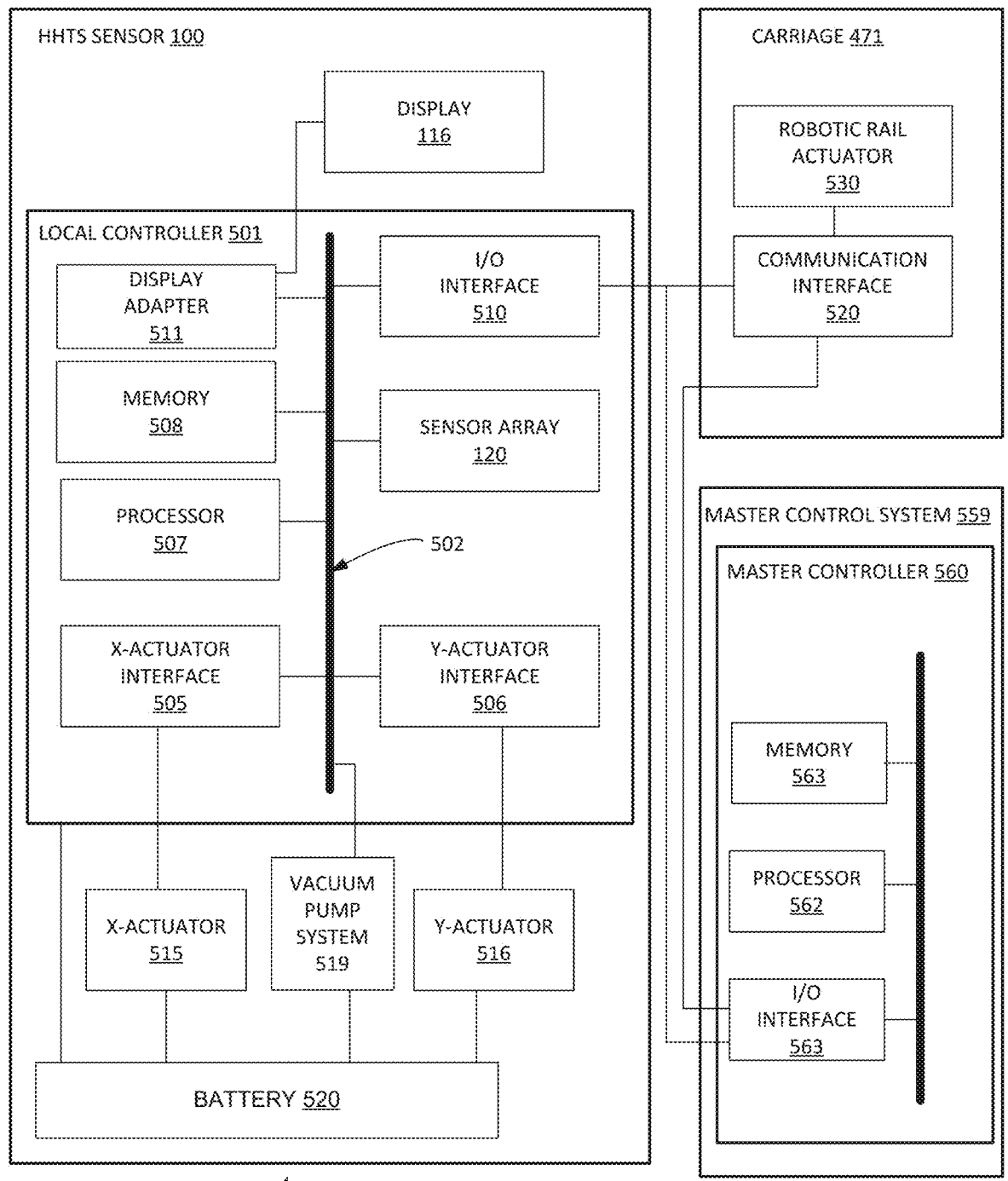
FIG. 5 shows a block diagram of an overall control system set in a manufacturing environment that includes hand-held through-skin sensor of FIG. 1 according to an embodiment of the subject matter disclosed herein.

FIG. 5 shows a block diagram of an overall manufacturing system 500 that may be set in a manufacturing environment that includes HHTS sensor 100 of FIG. 1 according to an embodiment of the subject matter disclosed herein. The manufacturing system 500 shown in FIG. 5 shows one specific configuration of an overall automated system whereby the HHTS sensor 100 is part of an automated system in which an operator may not utilize the HHTS sensor 100 in the manner described in previous stand-alone scenarios. Rather, the system 500 described in FIG. 5 is an integrated automated system 500 under the control and direction of a master control system 559. As such, an operator may simply control all manufacturing tasks through the master control system 559.

In this block diagram, the HHTS sensor 100 includes a local controller 501 (e.g., a local processor) for controlling actions and functions of the HHTS sensor 100 and, at times, the carriage 471. The local controller 501 includes a processor 507 configured to execute instructions that may be stored in a local memory 508. The memory 508 is coupled to the processor 507 via a communication and data bus 502. The bus 502 is also coupled to one or more interfaces 505 and 506 for one or more actuators, such as respective x-actuator 515 and y-actuator 516. Thus, as the sensor array 120 detects and underlying aperture, signals form the sensor array may be sent to the processor 507 through the bus 502 and then interpreted to produce actuation signals to the interfaces 505 and 506 for inducing movement in the respective x and y directions to zero in on the underlying aperture. The controller 501 also includes a display adapter 511 coupled to the bus 502 and coupled to the display 116. In other embodiments, additional interfaces (not shown) may be present for coupling additional modular devices or other devices (not shown).

The controller 501 may also be coupled to a pneumatic pump system 519 (e.g., a vacuum pump) via the bus 502 such that the processor may control the pneumatic pump system 519 in an automated manner. Further, the controller 501 is coupled to an on-board rechargeable battery 520 (e.g., a power source) to provide power to this and other components. The battery 520 is also coupled to the pneumatic pump system 519 the x-actuator 515 and the y-actuator 516.

The local controller 501 also includes an input/output interface 510 suitable for handling communication signals to and from other related manufacturing devices and controllers in the system 500. In this embodiment, the I/O interface 510 is communicatively coupled to a communication interface 520 housed within the carriage sub-system 471. In other embodiments, the communication interface 520 may be in direct communication with the master control system 559. The communication protocol for these devices may be standard Ethernet using TCP/IP protocol. Other embodiments may be a proprietary communication protocol, such as a proprietary "Smart Tool Protocol" (STP), using TCP/IP Ethernet or other standard serial or parallel interfaces (e.g., RS-232 or the like).

The communication interface 520 associated with the carriage 471 may be coupled to one or more robotic rail actuators 530 configured to move the carriage 471 in one or more direction or orientations (such as along a rail 472). The master control system 559, in turn, may include a master controller 560 that includes an I/O interface 561, a processor 562 and a memory 563 for accomplishing master control tasks and functions.

Figure 6:
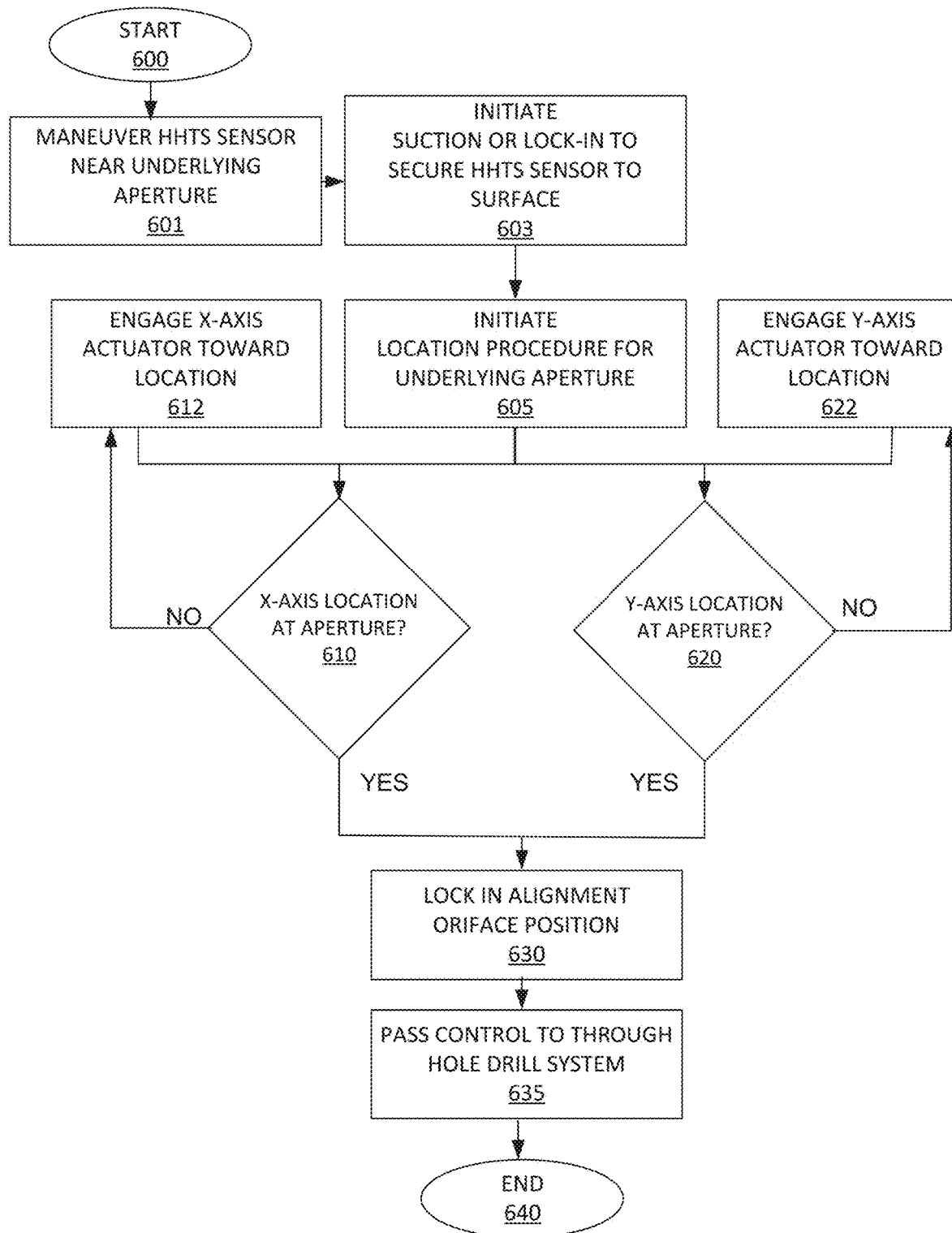
FIG. 6 shows a flow diagram of a method for using the hand-held through-skin sensor in a manufacturing environment of FIG. 1 according to an embodiment of the subject matter disclosed herein.

FIG. 6 shows a flow diagram of a method for using the HHTS sensor 100 in a manufacturing environment of FIG. 1 according to an embodiment of the subject matter disclosed herein. The method described with respect to the flow diagram of FIG. 6 is for a manufacturing function for locating an underlying aperture disposed below a skin or surface and then drilling a hole through a concentrically aligned orifice. The order and number of steps, and the steps themselves, may be different in other embodiments.

The method begins at step 600 and proceeds to a first step 601 wherein the master control system or an operator maneuver the HHTS sensor (100 of FIG. 1) to be adjacent to an underlying aperture in a support structure disposed below a skin or surface. During this time, one or more sensor array algorithms (as discussed above with respect to FIG. 2) may be continuously iterating to detect underlying apertures and/or targets disposed in apertures. If the master control system or operator can determine that the HHTS sensor 100 is close enough to display the aperture in the display somewhere, then the method may move to step 603 whereby the vacuum pump system is initiated (or in the case of a modular manufacturing environment as derived in FIG. 4, the robotic arm actuator may be locked into place). The vacuum pump forces air out of cavities formed by suction cups on the rear side of the HHTS sensor 100 and the surface. This step may be initiated by an operator actuating a pushbutton input disposed on the HHTS sensor 100 or may be initiated by a master control system once the display shows the detection of the aperture.

Once locked into place, the operator or the master control system may initiate an aperture location procedure at step 605. If this step is a manual step, the procedure may be initiated by the operator actuating a second actuation input button disposed on the HHTS sensor 100. If this step is an automated system step, the procedure may be initiated by the master control system after a requisite period of time whereby the HHTS sensor 100 is secured in place.

The automated location procedure includes two simultaneous operation branches, one for zeroing in on the x-location of the detected aperture with iterative steps 610 and 612 and one for zeroing in on the y-location of the aperture with iterative steps 620 and 622. Looking at the x-location branch, a vector and distance may be determined at the query step 610 in the x-direction. That is, the distance and direction (vector) of the alignment orifice away from the detected aperture may be determined in the x-direction only. If not aligned, the branch moves to step 612 where the x-actuator is activated to move the alignment orifice toward the detected aperture within the x-axis. This process will repeat until the alignment orifice and the detected aperture is aligned in the x-axis.

Turning to the y-location branch, a vector and distance may be simultaneously determined at the query step 620 in the y-direction. That is, the distance and direction (vector) of the alignment orifice away from the detected aperture may be determined in the y-direction only. If not aligned, the branch moves to step 622 where the y-actuator is activated to move the alignment orifice toward the detected aperture within the y-axis. This process will repeat until the alignment orifice and the detected aperture is aligned in the y-axis.

If both x and y directions are aligned (e.g., the alignment orifice and the detected aperture are concentrically aligned) then the HHTS sensor locks the alignment orifice into place, at step 630. As the alignment orifice is now concentrically aligned with the underlying aperture, the overall procedure is ready for drilling a hole through the surface using a drill. This may be accomplished manually by an operator or in an automated manner under the control of a master control system. Thus, at step 635, once concentrically aligned, an operator may engage a drilling procedure in a manual manner (e.g., place a drill bit in the alignment orifice and drill a hole. In the case of an automated environment, the master control system may then maneuver a drill into place and begin an automated drilling procedure. Although not shown as a step, and additional procedure for installing a rivet or bolt to secure the surface to the support structure may be accomplished either manually or automatically. The overall method may end at step 640.

Additional optional or alternative steps in this method include storing results of accomplishing the manufacturing functions in a local memory disposed in the one or more of the self-contained modular manufacturing devices. Another optional step may be loading parameters for accomplishing the manufacturing functions from a local memory disposed in one or more of the self-contained modular manufacturing devices prior to accomplishing any manufacturing function. Yet another option is to have third and fourth functions locally control after a control handshake.

Additional steps may be added in other embodiments, such as additional control handshakes with nested controllers as well as multiple functions at the same position, such as locating, drilling, measuring and installing a fastener with respect to a hole. Further, the steps of this method need not be performed in exactly the order depicted in FIG. 6 and some steps may be omitted. The above example is just one illustrative example out of many illustrative examples.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A self-contained device, comprising:
a sensor disposed in a housing and configured to determine a location of an aperture disposed adjacent to a surface;
an alignment assembly disposed in the housing and having an alignment orifice, the alignment assembly configured to maneuver the alignment orifice in an x-y plane within the housing, the alignment assembly including a first electro-mechanical actuator configured to move the alignment orifice in the x-direction in the x-y plane and a second electro-mechanical actuator configured to move the alignment orifice in the y-direction in the x-y plane;
a processor coupled to the sensor and coupled to the alignment assembly, the processor configured to receive a signal from the sensor indicating the location of the aperture and configured to control the first and second actuators to maneuver the alignment orifice within the x-y plane to be co-axially located with the aperture in response to the sensor signal;
a pneumatic pump disposed in the housing and configured to mechanically engage one or more pneumatic suction mechanisms disposed on the housing and configured to secure the housing to the surface; and
a power source disposed in the housing and configured to provide electric power to the sensor, the alignment assembly, the processor, and the pneumatic pump.

2. The self-contained device of claim 1, wherein the power source comprises a rechargeable battery.

3. The self-contained device of claim 1, wherein the pneumatic pump further comprises a vacuum pump and the at least one suction mechanism comprises two suction cups mechanically coupled to the vacuum pump.

4. The self-contained device of claim 1, wherein the sensor further comprises a plurality of magnetic sensor elements positioned in a pattern with respect to each, each magnetic sensor element configured to detect one or more electromagnetic fields.

5. The self-contained device of claim 4, wherein the pattern comprises a first set of eight magnetic sensor elements disposed on a first axis and a second set of eight magnetic sensor elements disposed on a second axis perpendicular to the first axis.

6. The self-contained device of claim 1, wherein the sensor further comprises an x-ray detection sensor configured to generate an x-ray signal suited to detect the location of the aperture.

7. The self-contained device of claim 1, wherein the sensor further comprises an ultrasonic detection sensor configured to generate an ultrasonic signal suited to detect the location of the aperture.

8. The self-contained device of claim 1, further comprising a tactile actuation input configured to initiate determining the location of the aperture disposed in the adjacent surface.

9. The self-contained device of claim 1, further comprising a handle coupled to the housing configured for gripping by a human hand.

10. A manufacturing system, comprising:
a carriage configured to support attached manufacturing components;
an aperture detection device coupled to the carriage and including
a sensor disposed in a housing and configured to determine a location of an aperture disposed adjacent to a surface;
an alignment assembly disposed in the housing and having an alignment orifice, the alignment assembly configured to maneuver the alignment orifice in an x-y plane within the housing, the alignment assembly including a first electro-mechanical actuator configured to move the alignment orifice in the x-direction in the x-y plane and a second electro-mechanical actuator configured to move the alignment orifice in the y-direction in the x-y plane;
a processor coupled to the sensor and coupled to the alignment assembly, the processor configured to receive a signal from the sensor indicating the location of the aperture and configured to control the first and second actuators to maneuver the alignment orifice within the x-y plane to be co-axially located with the aperture in response to the sensor signal;
a pneumatic pump disposed in the housing and configured to mechanically engage one or more pneumatic suction mechanisms disposed on the housing and configured to secure the housing to the surface; and
a power source disposed in the house and configured to provide electric power to the sensor, the alignment assembly, the processor, and the pneumatic pump;
a target configured to be placed in the aperture and detected by the sensor; and
an end effector coupled to the carriage and configured to perform a manufacturing task with respect to the aperture.

11. The manufacturing system of claim 10, further comprising a remote-control system communicatively coupled to the processor and configured to control the carriage, the aperture detection device and the end-effector remotely.

12. The manufacturing system of claim 10, wherein the end effector further comprises a drill configured to drill a hole concentric with the alignment orifice and the aperture.

13. The manufacturing system of claim 10, wherein the end effector further comprises a riveter configured to install a rivet concentric with the alignment orifice and the aperture.

14. The manufacturing system of claim 10, further comprising a lateral rail coupled to the carriage and configured to facilitate lateral movement of the carriage.

15. The manufacturing system of claim 14, wherein the pattern comprises a set of 16 magnetic sensor elements disposed in a circular pattern, each magnetic sensor element disposed equidistant from the alignment orifice.

16. The manufacturing system of claim 10, wherein the sensor further comprises a plurality of magnetic sensor elements positioned in a pattern with respect to each, each magnetic sensor element configured to detect one or more electromagnetic fields.

17. The manufacturing system of claim 16, wherein the pattern comprises a first set of eight magnetic sensor elements disposed on a first axis and a second set of eight magnetic sensor elements disposed on a second axis perpendicular to the first axis.

\* \* \* \* \*